United States Patent
Rauch et al.

(10) Patent No.: US 9,555,822 B2
(45) Date of Patent: Jan. 31, 2017

(54) ELECTRIC TROLLEY

(71) Applicant: AUROTEC GMBH, Voecklabruck (AT)

(72) Inventors: Ernst Rauch, Voecklabruck (AT); Stefan Zikeli, Regau (AT)

(73) Assignee: Aurotec GmbH, Voecklabruck (AT)

( * ) Notice: Subject to any disclaimer, the term of this patent is extended or adjusted under 35 U.S.C. 154(b) by 0 days.

(21) Appl. No.: 14/351,247

(22) PCT Filed: Oct. 11, 2012

(86) PCT No.: PCT/AT2012/050148
§ 371 (c)(1),
(2) Date: Jul. 11, 2014

(87) PCT Pub. No.: WO2013/052977
PCT Pub. Date: Apr. 18, 2013

(65) Prior Publication Data
US 2014/0332299 A1 Nov. 13, 2014

(30) Foreign Application Priority Data
Oct. 11, 2012 (AT) .................. GM556/2011

(51) Int. Cl.
B62B 5/00 (2006.01)
B62B 3/02 (2006.01)
B62B 3/12 (2006.01)

(52) U.S. Cl.
CPC ............ *B62B 5/0033* (2013.01); *B62B 3/022* (2013.01); *B62B 5/004* (2013.01); *B62B 3/12* (2013.01); *B62B 2202/404* (2013.01)

(58) Field of Classification Search
CPC ............ B62B 1/042; B62B 1/12; B62B 1/262; B62B 3/12; B62B 5/0026; B62B 5/0036; B62B 5/004; B62B 5/0043
USPC ........... 180/208, 19.2, 13, 19.1, 11; 280/639
See application file for complete search history.

(56) References Cited

U.S. PATENT DOCUMENTS

| 2,706,008 A | 4/1955 | Voigt | |
| 2,812,824 A * | 11/1957 | Adams | B60K 1/00 180/13 |
| 2,962,106 A * | 11/1960 | Burnside | B62B 5/0026 180/19.3 |
| 3,004,619 A * | 10/1961 | Straussler | 180/208 |
| 3,369,629 A * | 2/1968 | Weiss | 180/208 |

(Continued)

FOREIGN PATENT DOCUMENTS

| CN | 1112777 A | 11/1995 |
| CN | 2524795 Y | 12/2002 |

(Continued)

*Primary Examiner* — Darlene P Condra
(74) *Attorney, Agent, or Firm* — Laurence A. Greenberg; Werner H. Stemer; Ralph E. Locher

(57) ABSTRACT

A transport device has a carriage and at least three wheels mounted at a minimum of two axles. One of the axles is a driven axle which carries only a single, centrally mounted, electrically driven wheel. A support unit is configured to accommodate an elongated load, such as a golf bag. A guide component on a control side has a handle area. When the cart is in the operational position, the drive axle at the carriage is on hand at the control side, and the support unit substantially protrudes in the direction of the control side laterally across the drive axle.

20 Claims, 6 Drawing Sheets

(56) References Cited

U.S. PATENT DOCUMENTS

| | | |
|---|---|---|
| 3,561,555 A | 2/1971 | Carmichael |
| 3,635,301 A | 1/1972 | Tuson |
| 3,704,758 A | 12/1972 | Cropp |
| 3,871,464 A * | 3/1975 | Eden ................... B60K 1/02 |
| | | 180/19.2 |
| 4,061,360 A * | 12/1977 | Evans et al. ................. 280/652 |
| D321,964 S | 11/1991 | Alterbaum |
| 5,232,065 A * | 8/1993 | Cotton ................. B62B 5/0026 |
| | | 180/11 |
| 5,307,889 A * | 5/1994 | Bohannan ....................... 180/13 |
| 5,312,126 A * | 5/1994 | Shortt et al. .................. 280/287 |
| 5,375,673 A | 12/1994 | McCall et al. |
| 5,540,296 A | 7/1996 | Strothmann |
| 5,749,424 A | 5/1998 | Reimers |
| 6,168,174 B1 * | 1/2001 | MacDougall ............ B62B 3/02 |
| | | 280/47.34 |
| 6,481,518 B1 * | 11/2002 | Wu ..................... B60K 7/0007 |
| | | 180/19.1 |
| 6,916,028 B2 * | 7/2005 | Shapiro ..................... 280/47.34 |
| 7,451,848 B2 * | 11/2008 | Flowers et al. ............... 180/208 |
| 7,654,356 B2 * | 2/2010 | Wu ............................... 180/208 |
| 7,661,501 B1 * | 2/2010 | Perdue .......................... 180/210 |
| 7,882,918 B2 * | 2/2011 | Chin et al. ................... 180/220 |
| 7,967,095 B2 * | 6/2011 | Kosco et al. ................. 180/208 |
| 8,631,892 B2 * | 1/2014 | Constin ......................... 180/216 |
| 2008/0234886 A1* | 9/2008 | Richter ............................ 701/25 |
| 2009/0038864 A1* | 2/2009 | Yun ........................ B62B 1/045 |
| | | 180/19.1 |
| 2010/0155168 A1* | 6/2010 | Mies ............................. 180/300 |
| 2012/0168242 A1* | 7/2012 | Kulatunga ................... 180/210 |

FOREIGN PATENT DOCUMENTS

| | | |
|---|---|---|
| CN | 1400028 A | 3/2003 |
| DE | 20112755 U1 | 12/2002 |
| JP | H08229173 A | 9/1996 |

\* cited by examiner

FIG. 3A
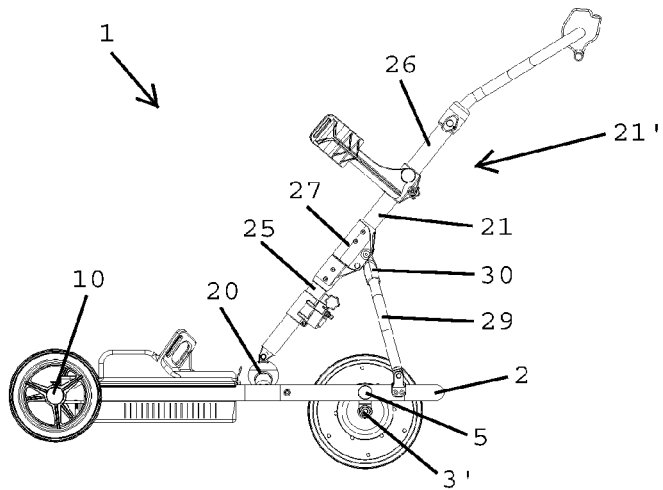
FIG. 3B
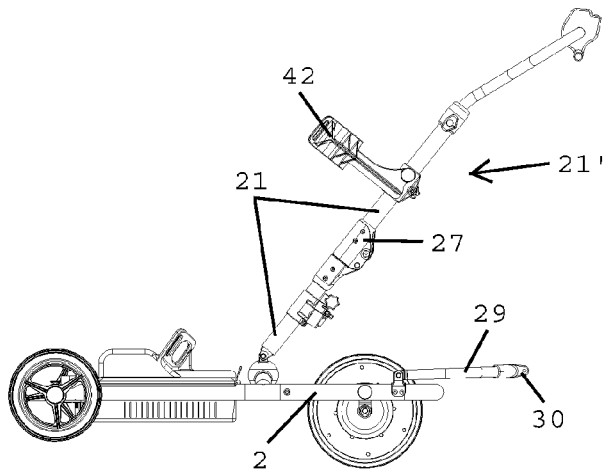
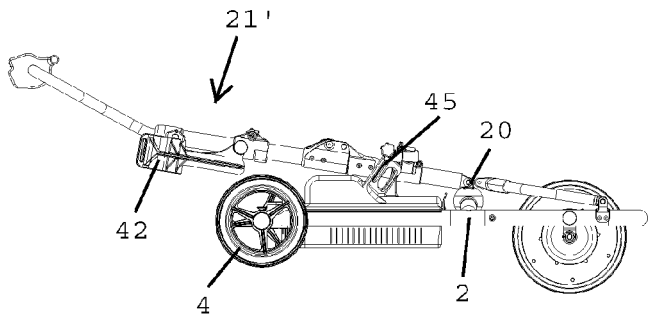
FIG. 3C
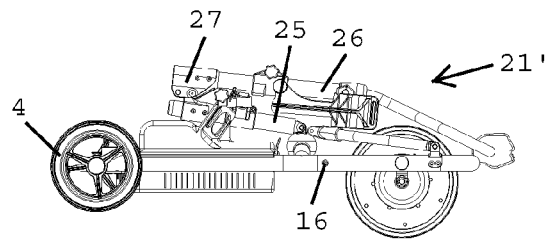
FIG. 3D

ELECTRIC TROLLEY

BACKGROUND OF THE INVENTION

Field of the Invention

The invention refers to a transport device with a carriage that mounts at least three wheels at a minimum of two axles, one of which is a drive axle which carries only a single, centrally mounted, electrically driven wheel, with a support unit that is equipped to take a longish load, preferably a golf bag, and with a guide component that is characterised on its control side by a handle area, whereby, when in operational position, the drive axle at the carriage is on hand at the control side.

Principally related devices, even though simpler, because they are not driven, are known in the prior art in different varieties under the term "golf trolley" and are popular among golfers for the transporting of golf equipment and for golfing. They frequently consist of a support unit mounted upon a single axle with two free wheels.

BRIEF SUMMARY OF THE INVENTION

To simplify the handling, especially when covering greater distances, different types of electrically driven golf trolleys have been developed, for which at least two main wheels are driven, either jointly or separately, and where an additional third wheel is provided in order to constitute a self-driven carriage. Such driven golf trolleys are demonstrated in U.S. Pat. No. Des. 321,964, U.S. Pat. No. 3,635, 301 A and U.S. Pat. No. 3,704,758 A. It is a common feature of all such golf trolleys, that, when tilted for manoeuvring, either all the drive wheels are lifted off the ground so that the trolley has to be pushed or pulled manually, or at least two distant drive wheels remain on the ground so that manoeuvring is made impossible or at least substantially more difficult due to the relative motion of the two wheels being blocked by the drive.

CN 2 524 795 Y shows a golf trolley of the above-mentioned type, where a support unit is connected to two large free-running wheels and protrudes above their axle. At the other, lower end, the support unit is connected by a shaft to a turn able fork. From the side opposite the support unit, a lever-like guide component protrudes which ends in a handle that enables the control of the angle of the fork and the resulting direction of motion of the golf trolley. If, at all, a tilting of this device is possible with the guide component over the drive axle, this is made very difficult, anyhow, by the position of the support unit on the side opposite the guide component, because the centre of gravity of the load or the device lies nearer to the axle with the non-driven wheels requiring the application of a high tilting moment due to the resulting long lever arm.

It is the object of the present invention to design a transport device of the above type that can be tilted simply, even in a loaded state, without requiring too much force, whereas there is no need to do without the drive or the optimal manoeuvrability in the tilted state. In addition, the width of the carriage on the control side is to be as narrow as possible, so that any accidental knocking of the legs is prevented during the handling of the transport device.

This task is solved for a transport device of the generic kind according to the invention by making the support unit protrude laterally above the drive axle principally in the direction of the control side. Thereby the support unit serves the storage of the longish load, which means, for example, that the load lies on at least two resting points of the support unit. The direction of the support unit is the connecting line between the resting points, which means that the support unit is principally parallel to the longitudinal axis of the longish load. If the support unit is laterally protruding across the drive axle, it means that, when loaded, the longish load and its longitudinal axis is equally protruding laterally across the drive axle. To prevent a sideway slide or roll away of the load, the support unit can be formed with safety juts on its sides. The resting points with safety juts on the sides can be formed, for example, by bent or U-shaped support elements. In this way, the centre of gravity of the device, particularly when loaded, is essentially placed directly above the drive axle or the driven wheel, in any case nearer to the drive axle than if the axle should be placed on the opposite carriage side. The positioning of the guide component can be freely chosen, basically independent of the support unit. The only criterion is that the handle area of the guide component is placed on that side of the transport device where the support unit (together with a possible load) protrudes above the drive axle. The guide component can, for example, consist of a bar or a bow that derives from the side of the drive axle of the carriage. Since the drive axle is present at the control side of the carriage, the transport device can be tilted by pivoting, that is, pushing down the guide component above the drive axle. In this tilted state only the single driven wheel mounted on the drive axle touches the ground, thus forming a pivotal point during manoeuvring or changing of direction, around which the device can be turned without much effort in order to steer the device by moving the guide component sideways. Another particular advantage of this device is that the carriage on the control side is extremely narrow, which allows the user, while pushing or pulling the device, to place his feet on the sides of the carriage, thus avoiding the tendency to knock the carriage by accident. Meanwhile, the two wheels on the side opposite the control unit act to stabilise the transport device.

The driven wheel may preferably be equipped with a hub motor. A hub motor integrated into the wheel is not only space-saving; it also allows a relatively economical operation of the transport vehicle due to its favourable torque. In addition, it promotes the intent of placing the device's centre of gravity as near as possible to the drive axle. Such motors are manufactured in high numbers for use in electrical bicycles, and are thus relatively cheap to acquire. The hub motor can be equipped with a gear box to make adjustments for terrain conditions and speed.

Favourable leverage during the tilting of the transport device can be achieved when the guide component extends from the carriage across the drive axle when in operational mode.

To reduce the overall weight as well as space requirements of the transport device according to the invention, it is advantageous if the guide component belongs to the support unit, whereby at least one pick-up element for the load is attached to the guide component. There are several reasons for a low overall weight of the transport device: it prolongs the life of the electrical drive and it facilitates transport of the transport device to and from the usage site. In addition, the longish load can lie across the pick-up element, or elements, in this case. This is furthermore of particular advantage in the case of golf bags, because it places the opening of the golf bag in close vicinity to the handle area of the guide component, which facilitates a swift changing of grip between the guide component and possible golf clubs.

In order to further reduce the overall weight as well as the space requirements of the device, the freely pivotable wheels can have a smaller diameter than the driven wheel. The diameter of the free wheels, in particular, can be as small as possible and just big enough for the expected ground surface, so that the device does not get stuck on a possibly uneven surface. For the drive wheel it is useful to choose a diameter according to drive function and, for instance, the desired torque, resulting generally in a bigger diameter for the drive wheel.

For the driven wheel, an essentially even running surface is an advantage. This does not mean that the entire running surface has to be even, but at least a partially even running surface will favourably achieve a wider contact area than a round running surface. This improves the stability of the transport device, particularly for a tilted position and impedes any sideways overturning. The tyres can be made of solid rubber or synthetic material; alternatively, a conventional bicycle tyre with rim and spokes, but with a smaller wheel diameter than for bicycles, can be used.

A space-saving means of transport of the transport device to the place of usage, such as a golf course, is made possible, when the carriage and the guide component can be folded into a transportable position, where, in folded transportable position, the guide component is essentially placed parallel to a base element connecting the axles, and where the guide component itself is preferably divided and foldable by a hinge. By this means, the space requirement of the transport device is essentially reduced to the base area of the carriage and, in its height, almost to the diameter of the drive wheel.

The undriven wheels are preferably joined with their axle in a detachable way, and auxiliary axles or axle stubs at the carriage are intended to allow a space-saving attachment of the undriven wheels in transportable position. In this case the undriven wheels can be detached from the carriage and placed parallel to a longitudinal extension of the carriage, so that the package measurement of the transport device in transportable position is further reduced.

For the electrical supply of the drive wheel, it has turned out to be advantageous if a drive battery at the carriage is essentially placed level with the axles. In this way, the battery that takes up, according to its running time requirements, a significant portion of the weight of the transport device, can be placed near the ground, lowering the centre of gravity for the device, thus improving its stability.

To control the drive or the drive speed, a simple way of handling the transport device can be achieved by attaching a control handle for the adjustment of the speed within the handle area of the driven wheel.

Since it is useful for many applications, especially when covering greater distances and usually for great distances between possible charging stations, to provide an indicator for the remaining operating range, a display to depict the battery charge status of a drive battery can be placed in the handle area of the transport device.

To achieve manoeuvrability or a change in the direction of the carriage without tilting the transport device, the drive axle can be favourably connected to the carriage over a turn able fork. In this way, the drive axle can be turned at an angle to the second axle and swivel out from a straight arrangement parallel to the free wheels.

If the turn able fork is rotatable by a control device with a steering drive, whereby the control device is also set up to control the drive wheel, an interaction of the two drives can, for example, be achieved in such a way that the drive speed is reduced in the case of a turned drive axle in order to prevent the transport device from toppling over.

In this context it is of great advantage, if the control device is connected with a wireless receiver to enable remote control. In this case, the transport device can be controlled by the user via remote control so that manual pulling or pushing is avoided.

An even more comfortable control can be achieved if the control device is connected with a GPS system, preferably, with distance sensors that recognise obstacles arranged at the carriage. Equipped in such a way, the transport device can drive by itself to certain points, such as stations on a golf course, or independently follow identification marks, for example, on a golf ball. With the help of distance sensors, collisions with obstacles or golf players can be avoided, and, for example, a tracking mode is feasible, whereby the transport device follows the user at a given distance.

In the following, the invention is further explained by means of preferred exemplary embodiments and in reference to its illustrations, to which it is not, however, to be restricted. In detail, the illustrations show:

BRIEF DESCRIPTION OF THE SEVERAL VIEWS OF THE DRAWING

FIG. 3A-D each of the side views of the transport device according to the invention as seen in FIG. 1 during transfer from operational mode (FIG. 3A) to transport mode (FIG. 3D);

DESCRIPTION OF THE INVENTION

Figure 1:
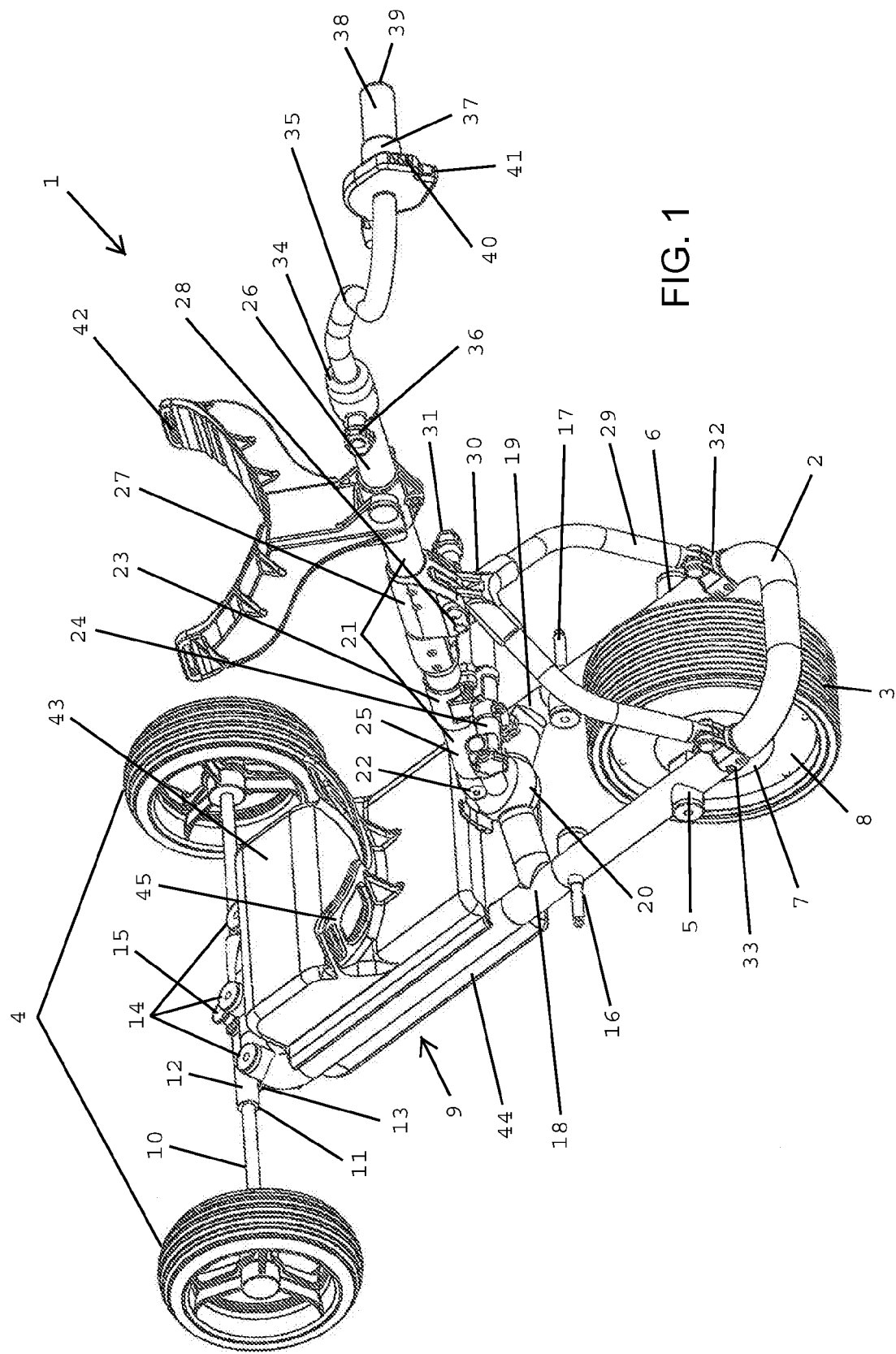
FIG. 1 a perspective view of the transport device according to the invention in operational mode.

FIG. 1 shows transport device 1 with carriage 2 and drive wheel 3 mounted on drive axle 3' (cf. FIG. 3A) as well as two undriven wheels 4. Carriage 2, here also called frame, can be assembled using different types of material. Not only plastic or metal materials in the form of tubes or profiled tubes, but also combinations of different materials such as plastic, stainless steel, steel, non-ferrous metal, light metal alloys, textile-reinforced materials such as carbon fibre tubes can be used. For assembly, carriage 2 is simply stuck together, bolted, glued, soldered or welded. It is also possible to combine the above-mentioned methods of joining. Drive wheel 3 is installed to carriage or frame 2 with two seat bearings 5, 6, which are connected to frame 2. It is also possible to install a wheel mount in the form of a turn able bridge construction with seat bearings 5, 6, to carriage or frame 2 (cf. FIG. 4).

Drive wheel 3 basically consists of a cylindrically formed ring-shaped carrier that can be fitted with a rubber lining. Centred inside the cylindrical carrier there is drive motor 7, a hub drive, connected to the cylindrical carrier of drive wheel 3 over cushioning discs 8 or spokes. This means that drive motor 7 is preferably designed as a hub drive, whereby the stator of drive wheel 3 is connected to carriage or frame 2 over seat bearings 5, 6, with bolting and other fixing devices. A voltage, supply and control cable (not shown) protrudes from hub drive 7 and can be conducted inside an electrical supply and control unit 9 via a bore hole in carriage 2. The mounting location of drive wheel 3 is designated as the mounting location on the operating side in reference to carriage or frame 2. Instead of hub drive 7, other single wheel drives are also, of course, conceivable.

In the rear area of carriage or frame 2, according to the illustration, or the front area of carriage or frame 2 when shifting application 1, which means lying opposite to drive wheel 3, two additional undriven wheels 4 can be attached over a shaft in order to balance application 1. The attachment can be carried out with the help of grooves at the respective ends of wheel shaft 10. Wheel fixing elements attached to wheels 4 can then snap into place in these grooves. Wheel shaft 10 is slid ably embedded in a plastic guide sleeve 11, and plastic guide sleeve 11 is built in and fixed in a carrier 12. Carrier 12—in this case designed as plate 13—is bolted and fixed at carriage or frame 2 in the front area of the frame with fixing devices 14. The fixing of plastic guide sleeve 11 and its carrier 12 can also be done by means of soldering, welding or gluing, or the combination of plastic guide sleeve 11 with carrier 12 can be jointly manufactured with carriage or frame 2. Wheel shaft 10 is secured against any sideways shift with fixing pin 15.

Fixing pin 15 also has the task of enabling carriage or frame 2 to be disassembled. This happens by removing one of wheels 4 from its groove joint with wheel shaft 10; following this, fixing pin 15 is lifted, and wheel shaft 10 can be pulled out of plastic guide sleeve 11. To achieve a relatively compact package and transport size, wheel 4, which has remained on wheel shaft 10, can also be removed from the groove joint and placed in a transport casing (not displayed here). In addition, wheel shaft 10, now free from wheels 4, can be stowed in the transport casing. A further possibility for storing wheels 4 can be that the removed wheels 4 are attached to holding bolts 16, 17 at carriage 2, so that they cannot be lost. Holding bolts 16, 17 can also be used to enable carriage or frame 2 to accommodate auxiliary wheels in addition to drive wheel 3 and front wheels 4 (cf. FIG. 2B). The auxiliary wheels can be without drive, but they can also be fitted with a motor and/or a gear motor used as a drive.

There are frame splitters 18, 19 built into carriage or frame 2 that serve as connections to central bearing 20 in the form of tee-joints and fork junctions. To bridge the distance between frame splitters 18, 19 and bearing 20, a coupling link can be installed. Bearing 20 can be Y-shaped, but can also be designed in its construction in such a manner that the Y-connection lies inside bearing 20, which makes it hidden from view. It is the purpose of bearing 20 to connect frame splitters 18, 19 with a guide component in the form of rod 21, whereby guiding rod 21 is embedded in joint 22, whereas the opposite side of joint 22 is fixed in bearing 20. Fixing can be done by pressing, gluing, welding, soldering or any other mechanical connection.

On guiding rod 21 a fastening device 23 can be fitted. Fastening device 23 serves to fasten take-along items such as umbrellas and brackets of any kind, or to fasten simple seating facilities. Fastening device 23 can, on the one hand, be moved and fastened along guiding rod 21, and has, on the other hand, a movable fastening bolt 24 by which the above-mentioned items can be fastened. Moving and fastening can be carried out with screwing, turning or clamping devices. When using a parasol or umbrella, for example, the umbrella rod can be placed on or pushed several centimeters into the ground and held with a fastening device. By this means, a toppling over of the umbrella can be avoided and it can be carried along on transport device 1 by slightly lifting it up before the drive is activated.

Guiding rod 21 is divided into a lower segment 25 and an upper segment 26 which are connected to each other with a fixing unit 27. Fixing unit 27 is itself subdivided, whereby the parts are rotatable around axle 28. With the help of axle 28, guiding rod 21 can be collapsed, so that transport device 1 can be folded together into an overall very compact size. The mechanical support and positional holding of guiding rod 21 for the lower segment 25 as well as the upper segment 26 is done by fixing unit 27, whereby an engagement unit 30 attached to support fork 29 engages directly with fixing unit 27 and is fixed with a locking device 31. In this way, guiding rod 21 and support fork 29 are joined in a form-locked manner. Support fork 29 is connected on both sides with carriage or frame 2 by connecting elements 32, 33. The connecting elements 32, 33 are designed in such a way that the support fork 29 can be tilted to the front and to the back, so that, again, a very compact packaging size can be achieved.

The upper segment 26 of guiding rod 21 ends in a further fixing unit 34, in which a shiftable formed handle bracket 35 is integrated. Handle bracket 35 is equipped with bore holes and grooves. If a shifting of the handle bracket is to take place, the position of handle bracket 35 can be adjusted and fixed in fixing unit 34. This can be carried out with the respective click-stop device 36.

As can be seen in FIG. 1, drive axle 3' is the axle lying nearest to handle bracket 35 (axle 10' of shaft 10 lies further away), so that a push on handle bracket 35, which can be easily exerted, for instance, by engaging the body weight of the user, can result in the tilting of transport device 1 over drive wheel 3.

A steering handle 37 is planned at the end of handle bracket 35. Handle 38 can be implemented at handle bracket 35 in such a way that a key switch 39 is integrated. Steering handle 37 can contain several functional displays and controls 40 and can be equipped with stop button or tempo mat button 41. Steering handle 37 is mostly manufactured as a multi-function device with tempo mat and battery monitoring. LEDs serve the monitoring of the charge condition of a battery to supply drive motor 7. With decreasing accumulator voltage, the lamps go off one after another. The power of motor/gear motor 7 is continuously adjustable from 0% to 100% with steering handle 37. As in the case of conventional accelerator handles, a retaining spring serves to automatically return to zero-position when the handle is released. This also means that the handle must be held like the handle of a motorbike in order to maintain a certain speed. If the fixing of a certain speed is required, the retaining spring can either be uninstalled, or a steering handle 37 with speed-lock function can be installed. For steering handles 37 or accelerator handle models that offer the speed-lock function, the present power of motor 7 can be electronically "frozen" by pushing a button, even if steering handle 37 is then released. The release of the tempo mat is subsequently carried out by the controller, which means the power is switched off when the tempo mat button is pushed again.

For holding loads or items such as golf bags, shopping bags, cases, etc., a pick-up element 42 can be arranged at the upper segment 26, or, where applicable, at the lower segment 25 of guiding rod 21, which can be designed to be either permanently fixed or shift able or turn able. The left (front) area of carriage or frame 2 contains control and electrical supply unit 9. Control and electrical supply unit 9 consists, according to the illustration, of a separable housing with cover 43 and housing base 44 that is built into carriage or frame 2. This placement location is only one of many options, so that other placement locations are possible. Housing cover 43 is designed in such a way that a support device 45 can be attached that can serve as an additional support for pick-up element 42. In this way, guiding rod 21 forms, together with pick-up element 42 and support element 45, a support unit 21' (cf. FIG. 2A) for the pick-up of a golf bag, whereby the two points of contact of support unit 21' are formed by support device 45, on the one hand, and pick-up element 42, on the other. Pick-up element 42 forms, because of its U-shape, the lateral protection noses of support unit 21'. When loaded, that is, with a golf bag, the centre of gravity of transport device 1 is directly above bearing 20.

Figure 2A:
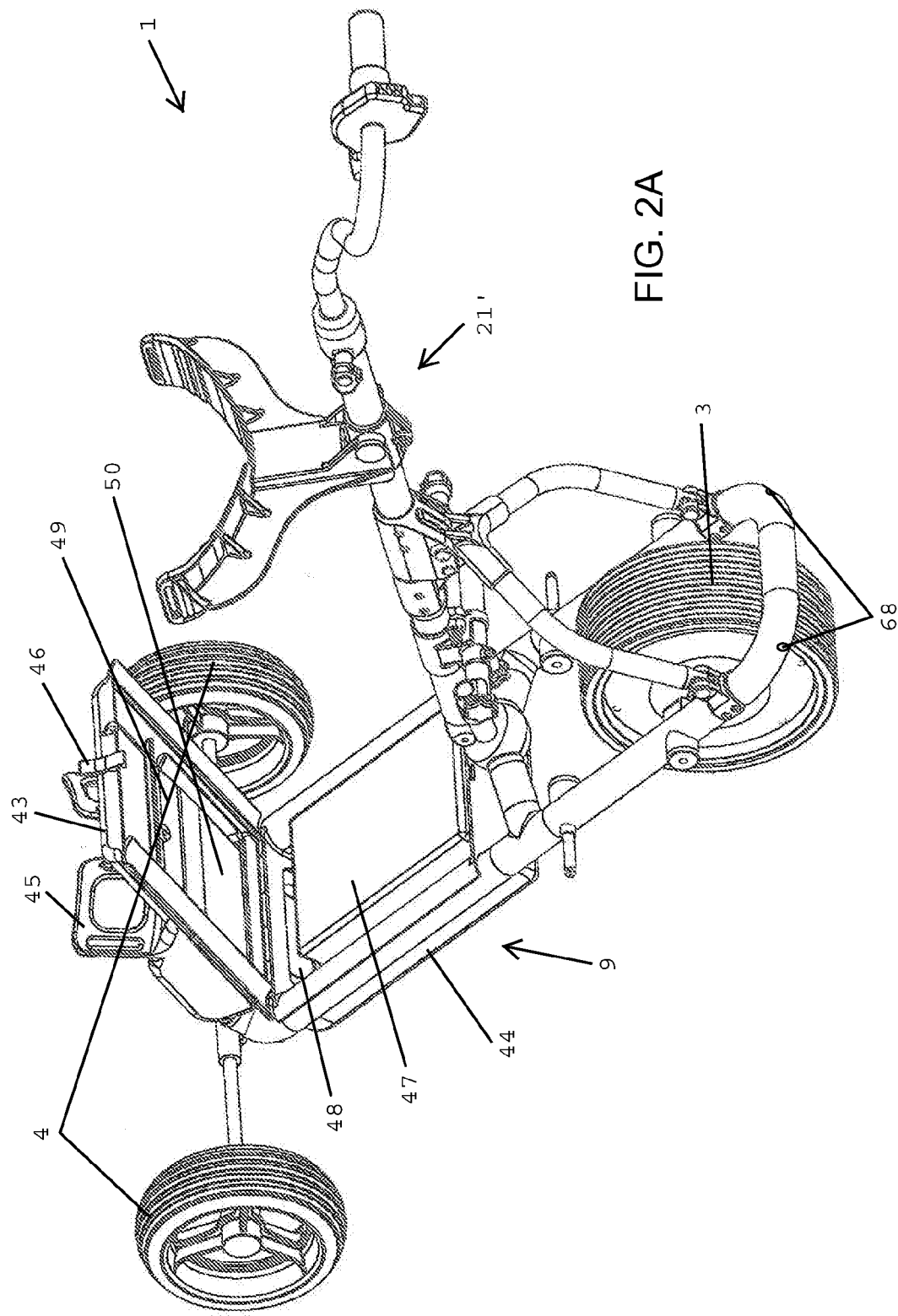
FIG. 2A a view similar to FIG. 1, but with an open battery compartment.
Figure 2B:
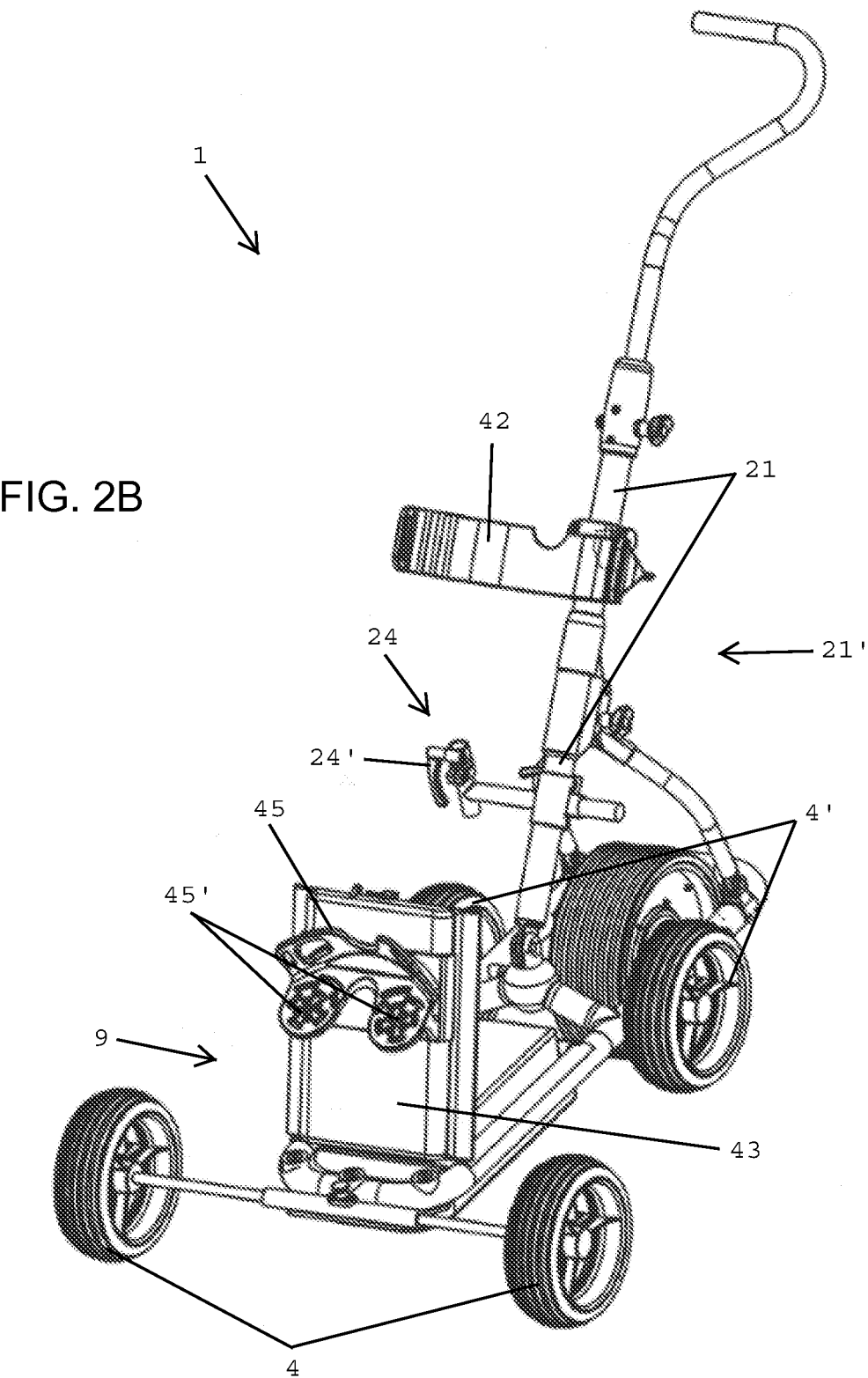
FIG. 2B a perspective view of the transport device according to the invention from a different angle of view with an open battery compartment and two additional bogie wheels.

FIGS. 2A and 2B show the carriage or frame 2 with opened up control and electrical supply unit 9. In this version housing base 44 rests on carriage 2 and is preferably also fixed to it. By means of a compression latch 46 the housing cover 43 can be lifted from housing base 44 and the housing opened. Inside control and electrical supply unit 9 there is an electrical supply source 47, a control unit 48 as well as a charger 49. Control unit 48 as well as charger 49 can be accommodated in the housing in such a way that an appropriate covering 50 contributes to additional protection and separation.

Housing base 44 contains cable outlets of control unit 48 and the controller, leading to carriage 2. Controller cables (connections) are led to handle bracket 35 and steering handle 37 as well as key switch 39 via frame splitters 18, 19, bearing 20 and guiding rod 21. A further cable connection between controller 48 and drive wheel 3 as well as hub drive 7, also over housing base 44 and frame 2, is designed in such a way that, for example, an outlet opening is created in the area of one of the pick-up elements 5, 6 of drive wheel 3 in frame 2.

Figure 4:
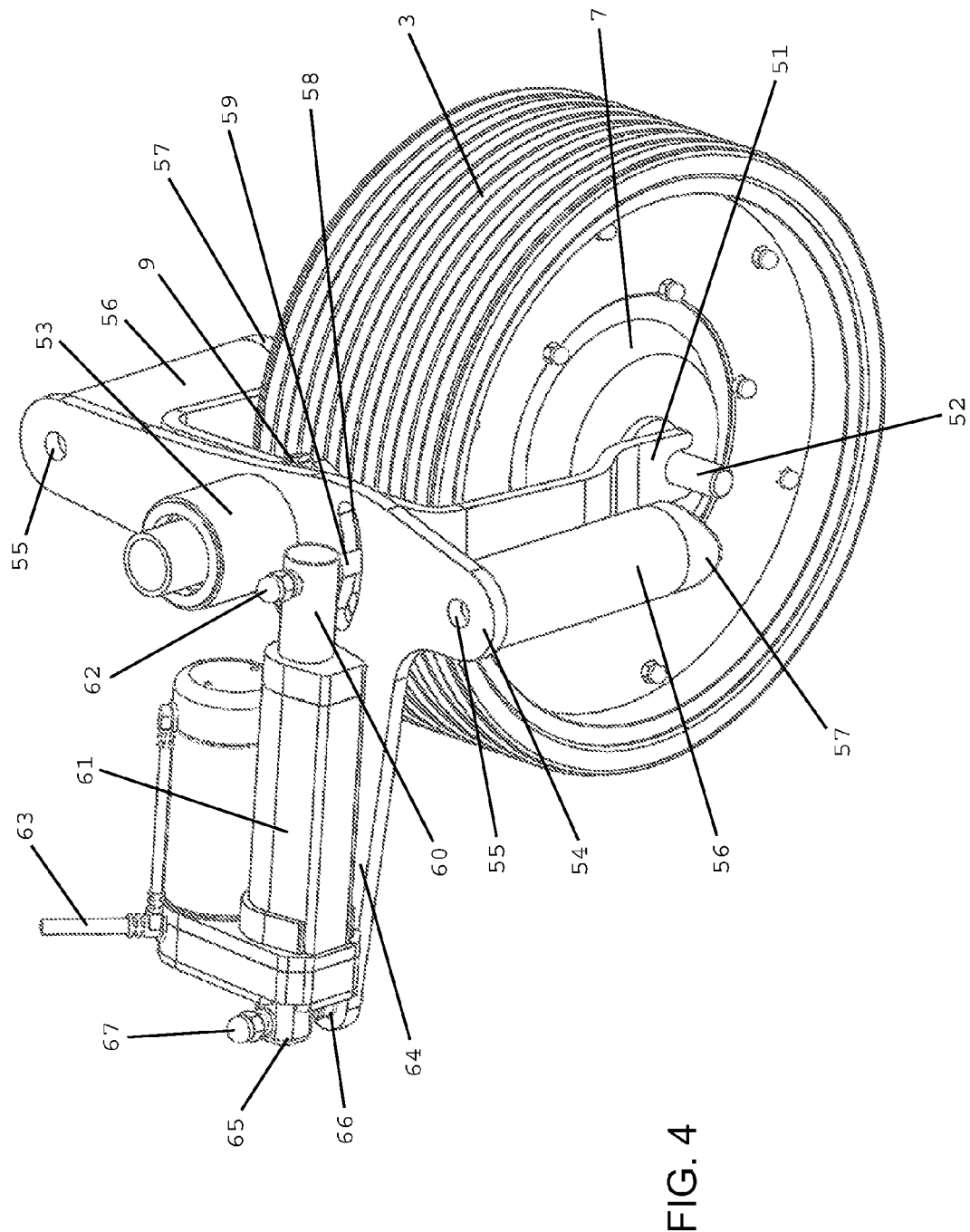
FIG. 4 a perspective view of a part of the transport device according to the invention with a drive axle mounted in a turnable fork.

To counteract a sideways overturning of transport device 1, the running surface of drive wheel 3 is shaped evenly (not curved) and not too narrow. A change of direction with a drive wheel 3 that is mounted, not pivotable, in frame 2 (as shown in FIG. 4), to drive around obstacles or uneven surfaces, for instance, may require a lifting of front wheels 4. An even running surface of drive wheel 3 that is too narrow, or a curved running surface, could result in an overturning of the un driven wheels 4 to the left or right over the tilting edge of drive wheel 3. To prevent this, drive wheels 3 with an even running surface were tested on a carriage 2 according to the invention. The running surface can be made of metal, synthetic or vulcanised rubber materials. The running surface can also be designed with a tread or with a protruding profile pattern in order to ensure improved surface adhesion or surface grip.

To determine the geometry of carriage 2, different diameters and widths of drive wheel 3 were designed in order to identify the preferred sizes empirically. The design of the surface was also taken into consideration during the tests. This means that there is a fast sideways overturning of carriage 2 over the tilting edge of drive wheel 3, if the width of drive wheel 3, and subsequently its contact surface or the contact surface of a curved drive wheel, go towards zero. From the tests to determine the geometrical relationships such as diameter and width of drive wheel 3, it can be deduced that the width cannot go below a certain size in order to achieve a good balance for drive 3.

Empirical and constructive considerations result, for practical purposes, in drive wheels 3 with a minimum diameter of 120 mm up to a maximum of 300 mm, whereby the diameter/width ratio of drive wheel 3 can take values between 0.6 and 3.25, preferably between 0.8 and 2.5. Due to the empirically determined diameter/width ratio of drive wheel 3 fixed at the back of carriage 2 as well as the two front wheels 4 fixed to the front area of carriage 2, driving stability is substantially improved compared with conventional carriages, where two drive wheel are assembled in the rear area. Carriage 2 remains stable and is reliably protected against overturning. Road adherence and cornering stability, listing angle and elevation angle are substantially improved by carriage 2 as described.

FIG. 2B shows transport device 1 from an angle of about 90° as compared to FIG. 2A, also with an open battery compartment. Cover 43 of the housing of control and electrical supply unit 9 is basically flat in this version. There is a support device 45 placed on the upper side of cover 43, characterised by two roughly semi-circled support tongues 45' and a central transit notch 45''. The support tongues 45' are an additional feature to counter the sliding of the load.

At the holding bolts 16, 17 at carriage 2, two additional wheels 4' are attached freely turn able at holding bolts 16, 17 of frame 2, so that transport device 1 features a total of five wheels 3, 4, 4'. The four freely turn able wheels 4, 4' are altogether detachable. The two additional wheels 4' support carriage 2 near drive wheel 3, so that drive wheel 3 is partially relieved. The diameter and axle position of the additional wheels 4' are chosen, regarding drive wheel 3, in such a way that their contact area is level with the one of wheel 3 and the other freely turn able wheels 4, so that all five wheels 3, 4, 4' have simultaneous ground contact. For heavy loads on carriage 2 the weight is subsequently spread advantageously over all five wheels 3, 4, 4'. To prevent drive wheel 3 from losing its ground contact, the additional wheels 4', or rather their axles, can be movably connected with carriage 2, for instance, with spring struts (not shown). In this way, the additional wheels 4' can give in, if one or both wheels 4' hit, for example, a bump in the terrain that leads to a lifting of the carriage. Alternatively, or additionally, drive wheel 3 or its axle 3' can be mounted in such a way that it maintains its ground contact even if the carriage is slightly lifted off the ground, which can, for instance, be achieved by means of a spring mounting of axle 3'.

In FIG. 2B, the shift able pick-up element 24 is fitted with a quick clamp 24', so that the clamping and release of, for instance an umbrella, can be carried out in a particularly easy fashion. As very easily visible here, pick-up element 24' runs at a certain lateral distance from support unit 21' and guiding rod 21, so that an umbrella that is arranged therein does not collide with a load placed in support unit 21'.

FIG. 3A to FIG. 3D show transport device 1 according to FIG. 1 in different positions, whereby, in particular, the relative arrangement of carriage 2, lower segment 25 and upper segment 26 of guiding rod 21 as well as support fork 29 is different in the individual figures: In FIG. 3A, transport device 1 is in the operational position of FIG. 1. Segments 25, 26 of guiding rod 21 are firmly connected to each other by fixing unit 27, and support fork 29 with its engagement unit 30 is contained in fixing unit 27 and fastened. Lower segment 25 forms, together with support fork 29 and frame 2, a triangular connection, so that guiding rod 21 is positioned at a fixed angle with frame 2.

To fold or collapse the transport device, the connection between engagement unit 30 and fixing unit 27 is released by unlocking locking device 31. After that, support fork 29 can be folded to the right (backwards), away from the guiding rod so that it is essentially placed parallel to frame 2, as shown in FIG. 3B.

For the position shown in FIG. 3C, guiding rod 21, now only pivotably connected by bearing 20 to frame 2, is folded forward over the axle of the un driven wheels 4. Hereby guiding rod 21 rests in a central clearance of support unit 45 (cf. FIG. 1). Additionally, the (upper) pick-up element 42 is folded towards guiding rod 21.

FIG. 3D, finally, shows a completely folded transportable position of transport device 1, in which, compared to the position in FIG. 3C, fixing unit 27 is unlocked and the upper segment 26 of guiding rod 21 is folded over its lower segment 25. In addition, both front wheels 4 could be removed from their axle and fixed to holding bolts 16, 17 (only holding bolt 16 is visible in FIG. 3D).

FIG. 4 shows the drive wheel unit according to one version, whereby drive wheel 3 is mounted pivotably in a bridge structure 54, and where it can be driven and steered by a motor 61, such as a drive motor. Drive wheel 3 is firmly connected to a fork-shaped device 51 by wheel axles 52. The fork-shaped device 51 is embedded over bearing 53 in bridge 54, whereby bearing 53 is fixed at the bridge with a screw cap. Bridge 54 is fixed at carriage or frame 2 (cf. FIG. 1) over bolted connections 55 and spacers 56 as well as connection elements 57. Bridge 54 is equipped with an arch-shaped slot (motion link) 58, in which bolt 59 is engaged as a steering and control lever that is connected with fork device 51. Bolt 59 is led through piston 60 of motor 61, which is, for instance, a linear motor, and secured with a fixing device 62.

Linear motor 61 is electrically connected to the control and electrical supply unit 9 by connector cable 63. To further support linear motor 61, a guide plate 64 can be fitted on bridge 54. Guide plates are usually made of technical synthetics and can also be lubricated, if required. Linear motor 61 is connected to a fixing bolt 66, which acts as a sliding and rotational bearing, over the rear part of lifting rod 65, whereby a locking device 67 secures the force-fit connection. Bridge 54 can additionally be equipped with measuring devices (not shown) for measuring the position of piston 60 in order to monitor the position of piston 60. The position identification of piston 60 can also be carried out by built-in Hall sensors in motor 61 itself.

When a motion signal is sent to linear motor 61 through control cable 63, piston 60 can move either one stroke forward, or, if an opposing signal is sent, one stroke backward. Due to its connection with bolt 59, bolt 59 is moved forward or backward in motion link 58. Due to the curved characteristic of the movement, drive wheel 3 can swivel to the right or the left and can thus contribute to the change of direction. The curved motion process results in the linear motor swiveling around fixing bolt 66.

It is obvious that the horizontal arrangement of linear motor 61 only constitutes one out of other possible embodiments. A motor arranged vertically above the bearing could also be used for the swiveling and control of drive wheel 3.

Due to the control of drive wheel 3 by linear motor 61 and the identification of the position of piston 60 of linear motor 61, an autopilot system can be set up, for golf trolleys, for instance. Autopilot systems are actually already known, whereby the autopilot system is connected over a network with an electrical source, a course compute unit—CCU, an electronic control unit—ECU and the drive unit (linear motor). Such autopilot systems can be used to stop and control the driving course. In order to facilitate the integration of an autopilot system, carriage 2 must be able to send the linear piston position feedback to the electronic control unit (ECU). Due to the network-compatibility of such systems the autopilot course control data can be passed on to other devices and utilised.

In addition to the GPS autopilot systems, conventional, and subsequently not to be described further, single or multiple channel ultrasound sensors 68 or optical sensors based on the reflection principle can be integrated in carriage 2 (cf. FIG. 2), so that carriage 2 can navigate itself around possible obstacles, and the vehicle position can be easily recognised. These sensors send and receive ultrasound signals and transfer the gained data to the control unit that calculates the distance between sensor and obstacle based on the runtime of the ultrasound signal. Once an obstacle is identified and falls short of the prescribed minimum distance, drive motor 7 can be stopped and linear drive 61 can be controlled accordingly to the calculated signal.

Figure 5:
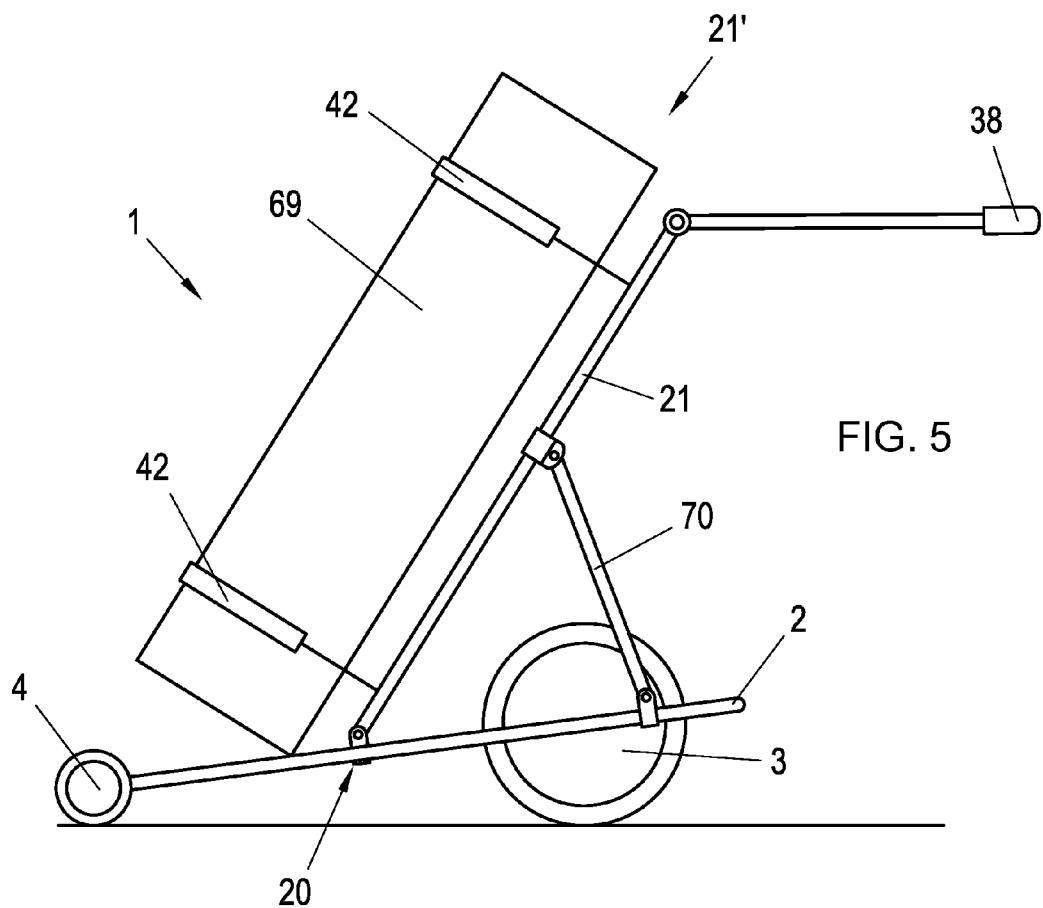
FIG. 5 a side view of a further option of the transport device according to the invention, with a golf bag.

FIG. 5 schematically shows a side view of a further embodiment of transport device 1 according to the invention, with a golf bag 69. Golf bag 69 is held in place by two load pick-up elements 42 that are fixed to guiding compo 21. Guiding device 21 is, on the one hand, connected to carriage 2 over tiltable bearing 20, and propped up on carriage 2 over support element 70, on the other. At the upper end of guiding part 21 a handle 38 is arranged to define the control side of transport device 1. In the area below the support unit 21' formed by guide component 21 and the pick-up elements 42 there is an electrically driven wheel 3 mounted on carriage 2. On a side opposite the control side, two smaller, freely pivotable wheels are mounted at carriage 2.

Figure 6:
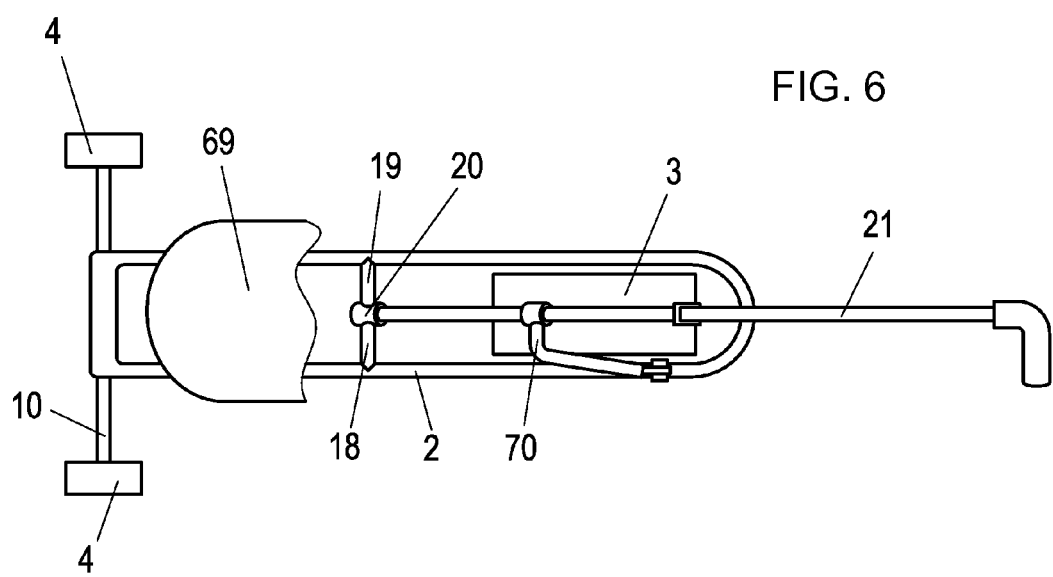
FIG. 6 a top view of the transport device according to the invention as seen in FIG. 5 with only parts of the golf bag shown.

The top view of FIG. 6 shows golf bag 69 only partially. The two freely pivotable wheels 4 are clipped on to shaft 10. In this view, it can be seen that, for this embodiment, support element 70 that connects guide component 21 with carriage 2 is shaped only on one side. It also shows that bearing 20 is fixed at the centre of carriage 2 by means of two frame splitters 18, 19. The width of carriage 2 is thereby essentially defined by the width of drive wheel 3, the width of which—as explained above—is determined by stability criteria.

For the electrical supply of drive 3, nickel-cadmium, nickel metal hydride, lithium ion or lithium polymer accumulators can be used. Using nickel-cadmium accumulators is, however, counter indicated by the toxicity of cadmium, whereas the shortcoming of lithium polymer accumulators is the high electrical, thermal and mechanical sensitivity of this type of accumulator. The energy density of the applicable accumulators lies between 30 and 200 Wh/kg at a cell voltage from 1.2 to 3.7 volts.

Accordingly, a battery system of parallel and series circuits is mostly used, for instance, three cells in a series and three parallel. Such battery systems are usually featured with a plastic housing and a cell retainer system, and can be equipped with a communication system for the data transfer to a charger.

In order to improve the operational safety of the accumulator used, battery 47 can be fitted with special safety mechanisms: in case of excessive current flow, the current can be automatically reduced; in case of high inner pressure, the load current is interrupted; safety valves and a predetermined breaking point can be activated at a certain inner pressure, so that an explosion of the cell is avoided; the upper and lower voltage limits are monitored during the charging process; a maximum charge and discharge current is designated, and a minimum and maximum charge and discharge temperature is taken into account. Overall, the battery systems applied are to be short-circuit proof, not inflammable, not combustible, and not explosive. For planning and execution it is advisable to observe packing arrangements and the thermal conditions in the package.

To charge the accumulator, an appropriate charger is provided, whereby particular care is to be taken regarding the interaction of accumulator and charger. The charging process is controlled by a charge regulator that is usually placed in the (separate) charger. Before charging, a possible deep discharge is determined by way of a charging circuit.

Preferably, a lithium ion accumulator 47 is used for the golf trolley shown here, for which the capacity of accumulator 47 is adjusted to the respective intended use, for instance, to the usual distance covered on the golf course. It is accordingly conceivable to offer different accumulator varieties, so that the transport device 1 is adjustable to the needs of the user. Typically, the golf trolley is supposed to be operational during a whole day of games, so that the accumulator can be charged overnight. Ideally, an accumulator is used with the capacity to last, for example, for a whole golf holiday of about a week. The use of lithium ion accumulators has stood the test of time with electro-bikes, and allows, in comparison with other types of accumulators, a significantly longer usage time.

Apart from the two-axle transport devices as shown in the illustrations, it is also conceivable that additional axles with freely pivotable wheels and/or additional driven wheels are provided. This is particularly advantageous in relation to a seating facility attached to guiding rod 21 because it allows better distribution of the load on carriage 2. If a seating or standing facility is planned for a user on carriage 2, transport device 2 can also be used for the transport of persons. In this case, guiding rod 21 can be moved into an essentially upright position, so that a control and steering of drive 7 and, possibly, power assisted steering can be made possible for the user sitting or standing on carriage 2.

The invention claimed is:

1. A transport device, comprising:
   a carriage having at least two axles and at least three wheels mounted on said at least two axles;
   one of said axles being a drive axle carrying exactly one of said wheels, centrally mounted and configured as an electrically driven cylindrical wheel equipped with a hub motor centrally integrated into said cylindrical wheel;
   a support unit supported on said carriage and configured to accommodate an elongated load;
   a guide component formed with a handle area on a control side of the transport device;
   wherein, by pushing down said guide component, the transport device is tiltable about said drive axle into a tilted operational position, wherein said drive axle at said carriage is present at the control side, said support unit extends on both a forward and rearward side of said drive axle in the tilted operational position, and only said single driven wheel has ground contact, wherein the guide component is mounted to the carriage between said at least two axles.

2. The device according to claim 1, wherein, in the operational position, said guide component extends from said carriage across said drive axle.

3. The device according to claim 1, wherein said wheels other than said driven wheel are freely rotatable wheels having a smaller diameter than said driven wheel.

4. The device according to claim 1, wherein said driven wheel is formed with a substantially flat running surface.

5. The device according to claim 1, which comprises a battery mounted to said carriage substantially level with said axles.

6. The device according to claim 1, which comprises a control handle mounted at said handle area for drive adjustment of a speed of said driven wheel.

7. The device according to claim 1, which comprises a display indicator at said handle area for indicating a battery charge status of a drive battery.

8. The device according to claim 1, which comprises a rotatably steerable fork connecting said drive axle to said carriage.

9. The device according to claim 8, which comprises a control device with a steering drive configured to rotate said steerable fork and wherein said control device is configured to control said drive wheel.

10. The device according to claim 9, wherein said control device is connected with a wireless receiver to enable remote control.

11. The device according to claim 9, wherein said control device is connected with a GPS system.

12. The device according to claim 11, which further comprises distance sensors mounted to said carriage, said distance sensors being connected to said control device and being configured to recognize obstacles.

13. The device according to claim 1, wherein said a support unit is configured to accommodate a golf bag.

14. The device according to claim 1, wherein said guide component is attached to said carriage via a frame splitter.

15. The device according to claim 1, wherein said at least two axles are affixed to said carriage.

16. The device according to claim 1, wherein said at least two axles are affixed to said carriage in a permanently parallel relationship.

17. A transport device, comprising:
   a carriage having at least two axles and at least three wheels mounted on said at least two axles;
   one of said axles being a drive axle carrying exactly one of said wheels, centrally mounted and configured as an electrically driven cylindrical wheel equipped with a hub motor centrally integrated into said cylindrical wheel;
   a support unit supported on said carriage and configured to accommodate an elongated load;
   a guide component forming a part of said support unit and having a handle area on a control side of the transport device; and
   at least one pick-up element for the load attached to said guide component;
   wherein, by pushing down said guide component, the transport device is tiltable about said drive axle into a tilted operational position, wherein said drive axle at said carriage is present at the control side, said support unit extends on both a forward and rearward side of said drive axle in the tilted operational position, and only said single driven wheel has ground contact, wherein the guide component is mounted to the carriage between said at least two axles.

18. A transport device, comprising:
   a carriage having at least two axles and at least three wheels mounted on said at least two axles;
   one of said axles being a drive axle carrying exactly one of said wheels, centrally mounted and configured as an electrically driven cylindrical wheel equipped with a hub motor centrally integrated into said cylindrical wheel;
   a support unit supported on said carriage and configured to accommodate an elongated load;
   a guide component formed with a handle area on a control side of the transport device;

said carriage and said guide component being configured for folding into a folded transportable position and wherein, in the folded transportable position, said guide component is substantially parallel to said carriage; and wherein, by pushing down said guide component, the transport device is tiltable about said drive axle into a tilted operational position, wherein said drive axle at said carriage is present at the control side, said support unit extends on both a forward and rearward side of said drive axle in the tilted operational position, and only said single driven wheel has ground contact, wherein the guide component is mounted to the carriage between said at least two axles.

19. The device according to claim 18, wherein said guide component is divided and foldable by a hinge.

20. The device according to claim 18, wherein said wheels other than said driven wheel are un-driven wheels detachably mounted to the respective said axle, and wherein said carriage includes auxiliary axles or axle stubs configured to allow a space-saving attachment of said un-driven wheels in a transportable position of the transport device.

\* \* \* \* \*

UNITED STATES PATENT AND TRADEMARK OFFICE
CERTIFICATE OF CORRECTION

PATENT NO. : 9,555,822 B2  
APPLICATION NO. : 14/351247  
DATED : January 31, 2017  
INVENTOR(S) : Rauch et al.

Page 1 of 1

It is certified that error appears in the above-identified patent and that said Letters Patent is hereby corrected as shown below:

On the Title Page

Item [30], insert:  
-- Foreign Application Priority Data  
Oct. 11, 2011   (AT)......... GM556/2011 --

Signed and Sealed this  
Eighteenth Day of April, 2017

Michelle K. Lee  
*Director of the United States Patent and Trademark Office*